United States Patent
Nerenberg

[15] 3,640,813
[45] Feb. 8, 1972

[54] ADAPTER FOR A MACROMOLECULE SEPARATION DEVICE

[72] Inventor: Samuel T. Nerenberg, 21 Hayward Ct., Burlingame, Calif. 94010

[22] Filed: June 9, 1969

[21] Appl. No.: 831,509

[52] U.S. Cl..................204/299, 204/180 G, 210/31 C, 210/198 C
[51] Int. Cl...........................................B01k 5/00
[58] Field of Search.................204/180 G, 299, 195 P; 210/31 C, 198 C

[56] References Cited

UNITED STATES PATENTS

| | | | |
|---|---|---|---|
| Re.24,865 | 9/1960 | Juda et al. | 204/98 |
| 2,913,386 | 11/1959 | Clark, Jr. | 204/195 |
| 3,070,539 | 12/1962 | Arthur et al. | 204/195 |
| 3,290,240 | 12/1966 | Neren | 204/299 |
| 3,326,790 | 6/1967 | Bergrahm | 204/180 G |
| 3,346,479 | 10/1967 | Natelson | 204/301 |
| 3,375,187 | 3/1968 | Buchler | 204/301 |
| 3,384,564 | 5/1968 | Ornstein et al. | 204/180 G |
| 3,506,554 | 4/1970 | Broome | 204/180 G |
| 3,533,933 | 10/1970 | Strauch | 204/180 G |

Primary Examiner—John H. Mack
Assistant Examiner—A. C. Prescott
Attorney—Flehr, Hohbach, Test, Albritton & Herbert

[57] ABSTRACT

A device for adapting an upstanding column to separate macromolecules in preparative amounts by means of electrophoresis, chromatography and electrochromatography carried out in a granular or nongranular gel medium disposed in the column. One device contains an electrically conductive, self-supporting gel disposed within a tubular housing adapted to sealingly engage the lower portion of the column. Channels may be provided in the adapter gel for fluid ingress to the upper gel surface and egress therefrom. A method for forming the adapter including electrophoresis and electrochromatography performed in a single column.

10 Claims, 5 Drawing Figures

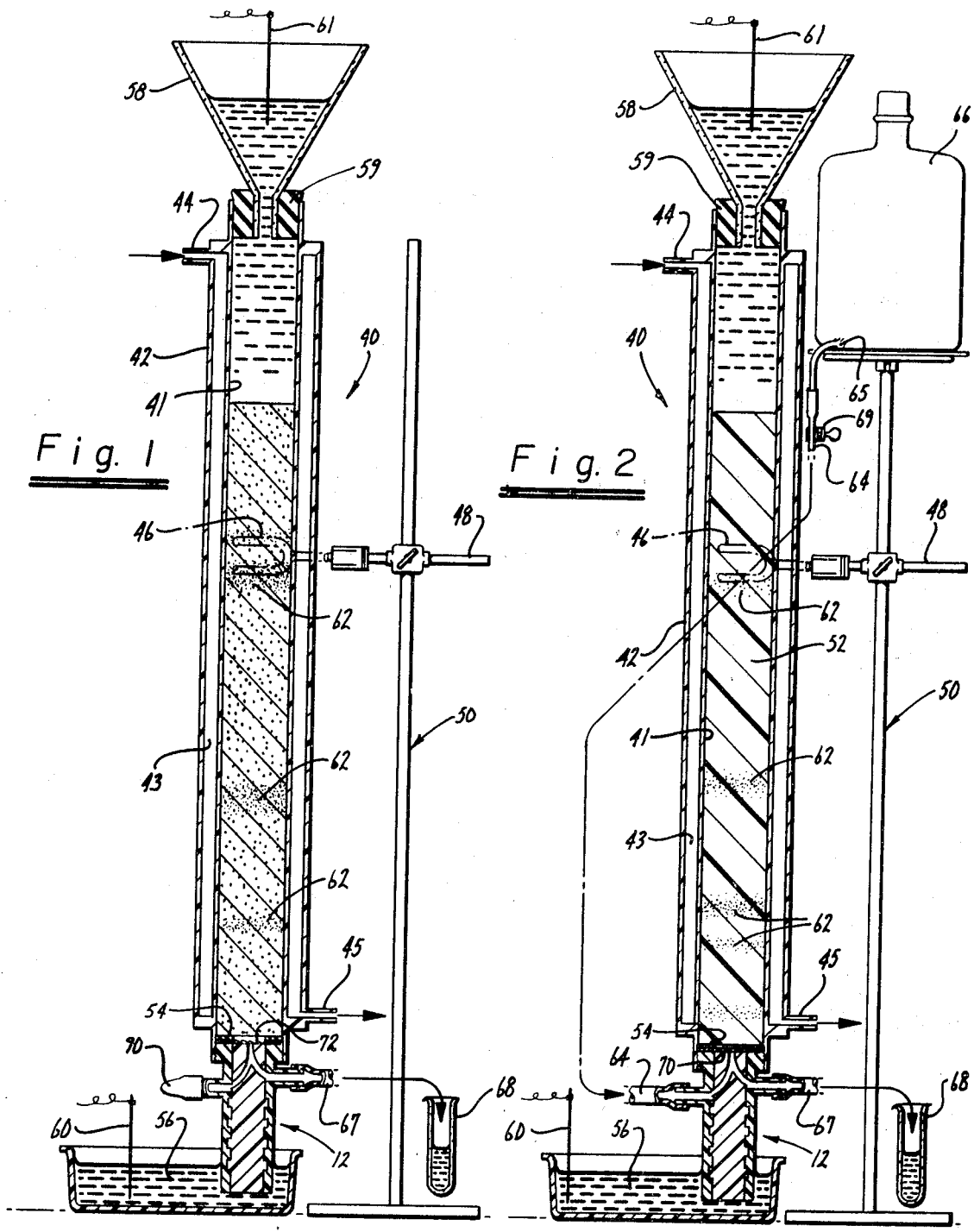

INVENTOR.
Samuel T. Nerenberg
BY Flehr, Hohbach, Test,
Albritton & Herbert
Attorneys

ADAPTER FOR A MACROMOLECULE SEPARATION DEVICE

BACKGROUND OF THE INVENTION

Column chromatography is widely used for the separation of mixtures of macromolecules such as proteins on crosslinked, insoluble, granular gels such as the dextran gel known as Sephadex. The resolving power of dextran gels depends for the most part on differences in the molecular weights of proteins, and to a much lesser degree on interactions between solute and gel. When considering the size proteins usually found in human serum, the resolving power of the latter type gel compares poorly, however, with that of electrophoresis in solidified (nongranular) acrylamide gels which separates proteins on the basis of charge and a sieving effect. Nevertheless, certain highly desirable features are associated with the technique of column chromatography which are not found with electrophoresis. Two such features found with the former technique is in the ability to (1) use larger samples and (2) recover proteins easily in preparative amounts and in high yield. Preparative electrophoretic techniques, utilizing nongranular gels, such as acrylamide gels, on the other hand, results in excessively high dilution of slow-moving fractions and comparatively low yields due to significant losses with extraction procedures; furthermore, the extraction procedures are tedious and time consuming.

At the present time, the technique of electrochromatography, a combination of electrolysis and chromatography, is particularly underdeveloped. Since electrochromatography is a very powerful separation technique, it is important to provide a single apparatus for performing this type of separation.

SUMMARY OF THE INVENTION AND OBJECTS

This invention is directed to a means for adapting a column, such as used for chromatography, to separate macromolecules by means of electrophoresis, chromatography, or electrochromatography.

The adapter is formed from an electrically conductive self-supporting solidified gel disposed within an open tubular housing constructed of materials such as rigid plastic. This housing is suitably adapted at its upper end to be sealed with the lower end of the separation column by external screw threads mating with internal threads of the column. When in a mating position, the separating medium in the column is supported by the adapter gel.

In one embodiment, inlet and outlet openings are formed in the tubular housing and two separate passages from the ports to the upper surface of the gel are provided for liquid flow. With this adapter in sealing engagement with the separation column, a number of alternative separations may be performed.

In one separation, electrophoresis is performed in a nongranular separation gel. The adapter is placed in a liquid electrolyte solution and a current is supplied to the electrolyte and to a buffer solution above the separation gel. The separation gel is subsequently cut to analyze the various bands of separated components.

In another separation, granular gel, such as dextran, is placed in an upright column. A buffer solution containing the macromolecules is poured into the column wherein the separation is performed. One of the ports in the adapter housing is stoppered and the buffer solution containing separated portions of the macromolecules is recovered through the other channel.

In still a further use for the device, electrophoresis may be performed with the proteins proceeding to the bottom of the nongranular separation gel. Both ports in the adapter are open. A buffer solution is fed to the outlet port of the adapter to contact the lower portion of the separation gel. The protein fraction at the bottom of the gel is then washed through the outlet port.

In the performance of electrochromatography, the electric current is applied in the same manner as in electrophoresis. As in chromatography, the buffer containing separated macromolecules emits from the adapter through the outlet port.

It is an object of the invention to provide a device for adapting an upstanding column to separate macromolecules by means of electrophoresis performed in a nongranular gel.

It is a further object of the invention to adapt an upstanding column to separate macromolecules by means of electrochromatography carried out in a granular gel disposed within the column.

It is a further object of the invention to provide a single device in which macromolecules may be separated by electrophoresis, chromatography, or electrochromatography carried out in a medium disposed in the column.

It is a further object of the invention to provide an adapting device for standard chromatographic columns to convert these columns into a flexible tool for carrying out electrophoresis, chromatography, or electrochromatography.

Other and further objects of the invention will be apparent from the following description taken in conjunction with the drawings appended thereto.

BRIEF DESCRIPTION OF THE DRAWINGS

FIGS. 1 and 2 are elevational views partially in section of two embodiments of the invention;

DETAILED DESCRIPTION OF THE PREFERRED EMBODIMENTS

Figure 3:
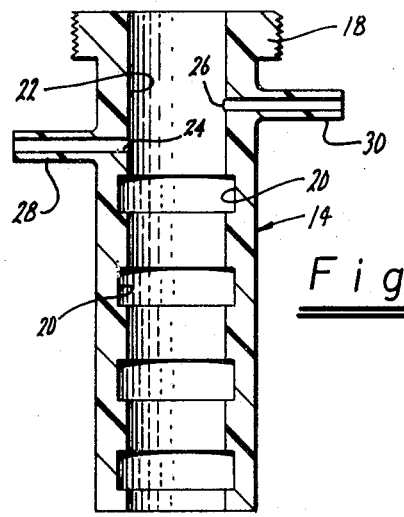
FIG. 3 shows one embodiment of an empty tubular housing according to the invention.

Adapter 12 includes an open tubular housing 14 and an electrically conductive, self-supporting solidified gel 16 formed therein. The housing is formed at its upper end into an externally threaded enlarged portion 18. Since an electric current passes through the gel, the housing should be formed from an electrical insulator, suitably acrylic plastic. Grooves 20 may be provided on inner surface 22 of the housing to aid in retaining gel 16, which is flush against surface 22, in a fixed position. Housing 14 is provided with inlet and outlet ports 24 and 26, respectively, to which are affixed inlet and outlet spouts 28 and 30, respectively.

Gel 16 is bounded at its free ends by upper and lower gel surfaces 32 and 34 which are suitably directly adjacent the upper and lower ends, respectively, of the housing. A passage 36 serves to provide an open communication between surface 32 and spout 28 suitable for the passage of liquid therebetween. Similarly outlet passage 38, communicates between surface 32 and outlet port 26. The method of forming the gel and its passageways will be described hereinafter.

The purpose of the adapter is to provide a flexible tool to perform electrophoresis and electrochromatography in a separation column. The gel must be firm enough to support a column of separation medium, such as a dextran gel, of a sufficiently large size to separate proteins, or other macromolecules, into amounts sufficient for analysis (preparative amounts).

Furthermore, the gel must be capable of carrying an electric current for electrophoresis supplied by contact of the lower portion of the gel with an electrolyte solution to which current is supplied. However, the gel should be chemically inactive to the electrolyte (c.f. metallic conductors). For electrophoresis, the upper gel surface must be in electrical contact with the separating medium (as will be explained hereinafter).

The gel 16 may be composed of any material that performs the above-discussed functions. It is preferred to form the gel from a gel-producing substance, such as an acrylamide monomer or agar, with a cross-linking agent in an electrolytic buffer solution, suitably a glycine-Tris buffer. The final gel entraps a portion of the buffer solution to enable the gel to carry electric current. A preferred starting composition is about 10–30 percent acrylamide with about 0.5–5 percent cross-linking agent in a 0.005 M glycine-Tris buffer. Below about 10 percent monomer, the formed gel does not have sufficient rigidity to support a separation medium. Above about 30 percent the gel becomes difficult to handle.

Referring to FIGS. 1 and 2, adapter 12 is shown in sealing engagement with a separating column 40. Column 40 is formed of an internal elongated tubular column 41. An external column 42 is affixed to a portion of column 41 suitably by welding to provide an annular cooling jacket 43 for the flow of cooling liquid, such as water, from inlet port 44 to outlet port 45. Both columns are formed of a suitable rigid plastic such as acrylic polymer. If extremely cool temperatures are desired, cooling liquids other than water, such as Freon, may be used. Cooling is desirable during electrophoresis to protect the protein from damage caused by the electric current. Column 40 is supported by suitable means such as clamp 46 affixed to tube 42. Clamp 46, in turn, is supported by adjustable sidearm 48 slidably received by ringstand 50.

Referring to FIG. 2, separating column 40 is shown in a position suitable for performing a separation by electrophoresis. A nongranular gel 52 is formed in place by the following technique (not shown). Adapter 12 is removed from the lower end of the column and replaced with an end piece which may be screwed tightly into position. A buffer solution containing a gel-producing substance is poured into the column and allowed to gel. Suitable nongranular gel-producing substances include acrylamide (about 7.5%), agar (about 0.5%), a mixture of agar (about 0.25%), and acrylamide (about 2.5%), or starch (about 13%). The buffer may be the same one used for the adapter gel. A small amount of water should be added to the surface of the gelled solution to prevent the formation of a concave meniscus in the upper surface of the formed gel. Following gellation, the lower end piece is removed.

After formation of the nongranular column, the adapter 12 is again screwed into position. Suitable sealing means, such as a rubber gasket 54, may be provided between shoulder 55 of the inner wall of column 41 and the upper surface of portion 18 to prevent fluid leakage.

Referring to FIG. 2, a column 40, is formed as above discussed, to separate proteins placed at the top of gel 52 by means of electrophoresis. Adapter 12 is placed in a liquid electrolytic buffer solution 56 which partially fills container 57. A plastic funnel 58 is fitted into an opening in plug 59, suitably formed from rubber, which, in turn, is held in the upper opening of column 41. A buffer solution, such as 0.005 M glycine-Tris buffer at a pH of 8.2 fills the column and part of the funnel.

Figure 5:
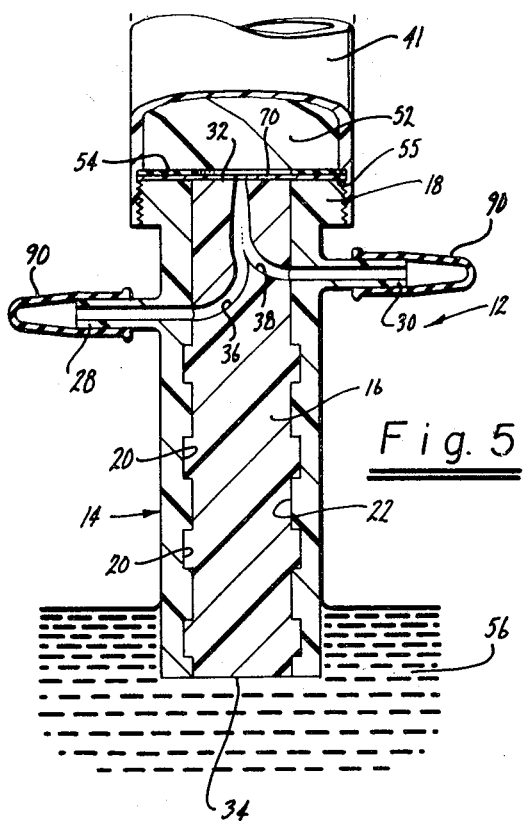
FIG. 5 is an enlarged portion of FIG. 2.

In one operational embodiment of the nongranular gel column in FIGS. 2 and 5, a sample, such as about 3–5 ml. serum, may be deposited evenly on the upper surface of the gel beneath the above-described buffer. Refrigerated cooling water is sent through cooling jacket 43. Then an electric current such as 400–500 volts (10–20 MA.) may be applied across electrode 60 in the lower buffer reservoir and electrode 61 in the upper buffer reservoir. Since electricity must be transmitted from the lower buffer solution to gel 52 via adapter gel 16, the upper surface should contact the lower surface of gel 52 (or a dialytic membrane placed therebetween as explained hereinafter). Since electrophoresis is performed in the downward direction, electrode 60 is made the anode while electrode 61 is made the cathode. When the recovery technique for the separated protein bands 62 is accomplished by a cutting-out and staining of individual bands, inlet and outlet spouts 28 and 30 may be sealed off suitably by fitting an eyedropper bulb over the spouts since these openings are not used.

In a technique for recovering the protein in a narrow segment of gel containing an isolated protein band, the band is again placed in the bottom of an empty column 40 from below. A column end piece may be screwed into place into the bottom of the column. Approximately 20–25 ml. of 7.5% acrylamide solution may be poured into the top of the column and allowed to gel about and over the inserted gel segment. The bottom end piece should then be removed and replaced by adapter 12. The bulbs on spouts 28 and 30 should be replaced by suitable tubing such as flexible plastic. Inlet tubing 64 is attached to interconnect inlet spout 28 and outlet 65 to buffer supply reservoir 66. Tubing 67 forms a passage between outlet spout 30 and test tube 68. The buffer flow from reservoir 66 may be adjusted by means such as clamp 69 to a suitable flow rate, such as 4 to 6 drops per minute. As the test tubes 68 are filled with protein fractions, they may be sent to suitable analyzing device such as an ultraviolet light monitor combined with recorder.

When supplying buffer from reservoir 66, the adapter should be slightly lowered by turning the adapter relative to column 41 to permit the flow of buffer between the lower surface of gel 52 and upper surface 32 of gel 16. The flow of gel between these surfaces dissolves the protein as the protein is emitted from the bottom of the separating gel 52. It has been found that placing buffer inlet port 28 at a lower position than outlet port 30 prevents the formation of air bubbles between the gel surfaces which would have a tendency to interfere with the flow of electric current therebetween.

If electrophoresis is to be carried out in the downward direction, a dialytic membrane 70, suitably of a material such as collodion, should be placed over the surface of the adapter gel 16 to prevent electrophoresis of proteins into the gel. The membrane allows the flow of electric current therethrough but prevents the flow of the large protein molecules downwardly into gel 16 of the adapter. To provide for buffer solution flow through the juncture of passages 36 and 38 to reach the lower surface of gel 52, a hole should be provided to fit over the juncture. Gasket 54 is placed over membrane 70 to hold the membrane in place while it performs its sealing function.

A series of electrolysis experiments were run with the above apparatus on a sample of pooled human serum with a 7.5% polyacrylamide nongranular solid gel in the column. The excellent resolution of approximately 25–30 well separated bands were obtained.

Referring to FIG. 1, separation column 40 is set up for either chromatography or electrochromatography in a manner similar to that shown in FIG. 2 for electrophoresis. The column is filled with a granular gel such as granular acrylamide, exchange resins, hydroxylapatite or a dextran gel, such as Sephadex. In a preferred embodiment, Sephadex G100 (a dextran gel of 10–40 u. granule size) in a 0.005 M. glycine-Tris buffer at a pH of 9.0 was used to fill the column. This size gel was preferred for the experiments described hereinafter since the elution rate (5–6 drops per minute) was the natural flow rate of the system and required no regulation. For the performance of electrochromatography, this rate of elution allowed the labeled albumin to slowly descend in the Sephadex column even though electrophoresis was concomitantly being carried out in the opposite (upward) direction.

When a granular gel is used, suitable filter means such as a piece of fine mesh nylon cloth 72 of the same dimension as dialytic membrane 70 should be placed over the upper surface of adapter 12 before engagement of the adapter with the column. The cloth prevents the loss of the gel through the buffer channels.

When chromatography is performed, no electricity is needed. Inlet port 24 may be suitably closed off by eyedropper bulb 73. There is no need for buffer from reservoir 66 since the buffer at the top of the column proceeds through the granular gel, carrying the separated protein sample with it. A detailed description of column chromatography in Sephadex is recited in the article, Easterday, R., "Cross-Linked Gels Enhance Chromatographic Techniques," Laboratory Management, 22–43, Aug. 1968. gel-producing When electrochromatography is performed, the electric current is sent through the granular gel. As with electrophoresis of a nongranular gel, dialytic membrane 70 should be placed between the adapter gel 16 and the granular gel if there is any possibility that electrophoresis will drive protein into the adapter gel.

In a performance of electrochromatography on a blood serum sample, it is preferred to carry out chromatography in a downward direction, and electrophoresis in an upward direction. Since the direction of electrophoresis is reversed from the procedure previously described for electrophoresing downwardly through a nongranular gel, the direction of current must also be reversed. Therefore, electrode 60 is the anode and electrode 61 is the cathode. The cooling system, the same as described for electrophoresis in FIG. 2, should be run at least 5 to 10 minutes before placing the sample on the column. The sample should then be placed under the buffer at the top of the Sephadex column and outlet port 26 should be opened to allow the sample to enter the granular gel. At this time the electric current for electrophoresis should be applied. For this particular granular gel (Sephadex G100) the elution rate (5-6 drops per minute) through port 26 and into test tube 68 was the natural flow rate of the system and required no regulation.

FORMING THE ADAPTER GEL

Since gel 16 within housing 14 contains channels, is flush with the inner housing wall, and essentially fills the tube, a method for its formation had to be devised.

Figure 4:
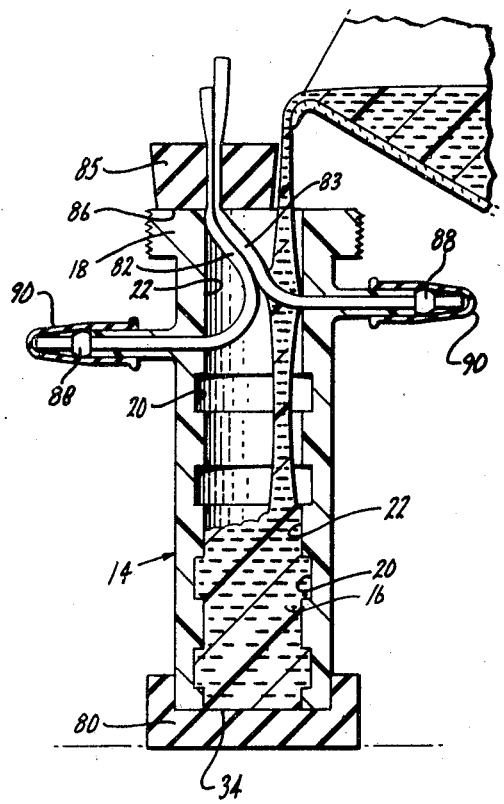
FIG. 4 shows one embodiment of the process of filling the housing of FIG. 3 according to the invention.

One embodiment for forming the gel is shown in FIGS. 3 through 5. The opening in the lower portion of the housing 14 is suitably sealed against liquid flow by placing the lower housing wall into a cavity in a flexible stopper 80 of a material such as rubber. Flexible tubing sections 82 and 83 are passed through ports 24 and 26, respectively, and then through a single hole in stopper 85. Surface 86 of the stopper is of a larger outer diameter than the upper housing 18 to prevent the stopper from projecting into the housing cavity. Sleeves 88 are provided for tubing 82 and 83 to hold the tubing in spouts 28 and 30 when taking up the tubing slack by pulling upwardly on the tubing extending through stopper 85. Eyedropper bulbs 90, or other suitable sealing means, should then be placed over spouts 28 and 30 to prevent fluid flow therethrough. After the above steps, the gel-producing solution may be poured through an opening between the top of housing 14 and stopper 85 before the stopper is placed to close this opening. The solution should be filled to the top of the adapter to eliminate any possible dead space. A suitable solution is 15% acrylamide in 0.005 M. glycine-Tris buffer, pH 8.2 (3 percent cross-linking). Stopper 86 should then be forced downward to the upper edge of the adapter by pulling tubing 82 and 83, as previously described, so that surface 86 contacts the gel solution. The adapter may then be set aside until a firm gel is formed (approximately 30 to 60 minutes). After gellation, bulbs 90 and then sleeves 88 should be removed. Stopper 85 and tubing 82 and 83 should then be removed from the solid gel leaving passages 36 and 38 through the gel forming an open passageway between gel surface 32 and the surroundings through spouts 28 and 30.

ELECTROCHROMATOGRAPHIC PROCEDURES AND RESULTS

A number of separations were performed on two types of serum, one from a case of multiple myeloma, and the other from a pool of serum obtained from a hospital chemistry department. Both serum specimens had been preserved in the refrigerator for several months. The sera were not treated in any way except to add bromophenol blue dye as a label for the albumin and sucrose to increase the specific gravity. Five ml. of serum were used on the larger columns and 2 ml. on the Sephadex column.

Two electrochromatographic techniques were used for the above separations. In a "continuous" technique, electrophoresis and chromatography were allowed to proceed simultaneously in opposite directions (chromatography downward and electrophoresis upward) until all the proteins were washed out into the fraction collector.

In an "interrupted" technique, chromatography (without electrophoresis) was allowed to proceed until the bromophenol blue dye (added as a label) descended to a level which was approximately one-third the length of the gel, following which the chromatography was interrupted and the electrophoresis in the upward direction was begun and allowed to continue overnight (without chromatography). On the following morning (14-16 hours later) chromatography was restarted in a downward direction while electrophoresis was continued simultaneously in the upward direction until all of the proteins were washed out into the fraction collector on the following day (approximately 24 hours in a 45 cm. long column). When a 90 cm. long column was used, the proteins were not completely eluted until the 3rd day (approximately 48 hours after the beginning of the run).

Excellent separations were obtained in the above separations with superfine Sephadex G 100. Approximately 15-16 peaks were obtained with both pooled serum and also with serum from the case of multiple myeloma. When electrochromatography was run continuously without interruption from the start (continuous method), protein fractions were first detected in the effluent in approximately 3 hours, using the 45 cm. long columns. When chromatography was interrupted to allow electrophoresis overnight, followed by electrochromatography (interrupted technique), the first fractions appeared rather quickly (30-60 min.). When the interrupted technique was used with the 90 cm. long columns, the first protein fractions appeared approximately 24 hours after chromatography was restarted. With the continuous technique the first protein fractions obtained, both with the normal and myeloma sera, were pure gamma G globulin. Albumin appeared mixed with the gamma globulins in later fractions and was found mixed with all subsequent fractions until it appeared in the pure state toward the end of the elution. When fractions containing the mixture of gamma-globulins and albumin were electrophoresed in agar, they migrated to their usual positions when compared to normal control serum.

With the interrupted technique, no contamination of the gamma, beta, or alpha-2 fractions with albumin occurred. However, albumin was mixed with the alpha-1 fraction. When the 90 cm. long column was used with a 5 ml. serum sample, approximately the same number of peaks (15-16) were obtained, but they were much lower and drawn out. The number of fractions needed to elute all of the serum proteins increased from 140 with the 45 cm. long column to 340 fractions with the 90 cm. long column. Separations of the various proteins, however, appeared to be materially improved with the longer column. The alpha-1 globulin albumin, and prealbumin areas appeared to be well separated.

The best resolution of mixtures of proteins were usually obtained by a combination of techniques as compared to any single technique. The ability to quickly and economically adapt a widely used chromatography column (Sephadex) to use with multiple techniques (preparative electrochromatography, electrophoresis, and/or chromatography) in nongranular and granular gels in a single column provides great flexibility and convenience in the separation of protein mixtures. Use of multiple techniques on a single supporting medium has an additional practical advantage in that it permits a worker to restrict the number of supporting media that he must gain experience with to solve particular problems. For example, for identification by means of polypeptide analysis (finger printing), an "abnormal" hemoglobin variant must be isolated in pure form from other hemoglobins present. This usually necessitates the use of an anion exchange resin or gel. With the equipment described above, a hemoglobin variant may be readily separated and purified on a gel, as Sephadex, by means of electrochromatography.

The superior resolving properties of a "combined" technique, as electrochromatography, over chromatography can be readily demonstrated by use of whole serum, labeled with bromophenol blue, on a Sephadex column using the G 100 gel. The labeled albumin band can be seen to steadily widen during its descent in the column if no current is allowed to flow through the column during the chromatographic procedure. If, on the other hand, electrophoresis is started in an upward direction after the serum has entered the gel, and is continued throughout the run while simultaneously limiting the chromatographic descent of the labeled band by regulating the downward flow of buffer through the column, one can easily keep the albumin band sharp and narrow until its eventual washout into a fraction collector.

The extent of improvement in resolution can be further gauged by the obtaining of 16 or so peaks *(untreated serum) with electrochromatography as compared to three peaks with chromatography alone.

The explanation for the greatly improved resolution of serum proteins with electrochromatography as compared to gel filtration (chromatography) appears to be due to the fact that the relatively large molecular weight gamma globulins are eluted out early if only chromatography is used. Since these molecules are relatively little affected by electrophoretic forces, little difference in their elution pattern is evident on either chromatography or electrochromatography. Prealbumin and albumin, having a relatively small molecular weight as compared to the gamma globulins, are eluted out toward the end of a chromatographic run. However, the lighter proteins are (by virtue of their charge) markedly affected by the electrophoretic force. Thus, in the case of serum, many of the different sized molecules are acted on almost independently by the two physical components of the system. Since the relatively heavy gamma globulins are greatly influenced by chromatography in the downward direction while the lighter molecules, as prealbumin and albumin, are most markedly affected by electrophoresis in the upward direction, the combined effects of electrochromatography (in opposite directions) will be greater than the separating abilities of each procedure. The unexpected finding of pure $\gamma$-globulin in the electrophoretic fast "prealbumin area" remains to be explained.

Although electrochromatography is very useful for many separation problems, its resolving power will depend on the starting material. For example, although the latter technique shows significantly improved resolution over gel filtration, it is usually inferior to disc electrophoresis on nongranular acrylamide gels with the size proteins found in serum. The same technique is, however, much superior to disc electrophoresis in separating very large size "particles" as viruses and ribosomes.

At the present time, the optimal use of preparative disc electrophoresis appears to be in conjunction with (following) electrochromatography where it can be used as an adjunct in separating electrochromatographically unresolved proteins. However, the fact that pure $\gamma_G$-globulin can be obtained in the pure state by the technique of electrochromatography, and not by disc electrophoresis, indicates that the resolving power of the former technique surpasses that of disc electrophoresis in some respects. Use of longer columns (90 cm.) promises to extend even further the superiority of electrochromatography in obtaining pure fractions.

An interesting finding occurring with chromatography of serum proteins concerns itself with albumin. Albumin is usually found as a heavy contaminant in fractions of proteins separated from serum where it would normally not be expected to occur. Much experimental evidence suggests that this "anomalous behavior" on the part of albumin is due to the formation of dimers, trimers, and even tetramers with resulting progressive increases in molecular weight. With the technique of gel filtration, the larger molecular weight substances are eluted first, in the order of their relative molecular weights. However, the albumin polymers must possess a net negative charge which is similar to the albumin monomer since fractions containing the albumin polymers, mixed with $\gamma$-gobulins, migrate on electrophoresis with the same speed to the anode at pH 8.6 as the monomer in normal control serum. At the same time, the $\gamma$-globulins, both in the fractions with the albumin polymers and in the normal control serum, migrate with the same speed toward the cathode. These observations suggest a method of preventing the contamination of globulin fractions by albumin, viz use of chromatography downward followed by a relatively prolonged period of electrophoresis (without chromatography) in the upward direction as described above. All of the albumins (monomer and polymers), having the same net charge, would be expected to migrate together to the anode. The $\gamma$-globulins, having a relatively weak positive charge, would be expected to be relatively little affected by the current flow and to remain in the portions of the column reached during the chromatographic descent. Such a sequence of events appears to take place as demonstrated by the findings of contamination of the $\gamma$-globulins with the "continuous" technique and the absence of such contamination with the "interrupted" technique.

I claim:

1. A device for adapting a vertical separation column to separate macromolecules by means of electrophoresis, chromatography, or electrochromatography carried out in a medium disposed in the column, said device comprising a vertical tubular housing with grooved inner walls, said housing being open and threaded at its upper end so as to be adapted for sealing engagement to a mating lower end of the separation column, an electrically conductive, self-supporting, solidified gel secured within said tubular housing by said grooved inner walls, said gel extending upwardly therethrough so as to form a seal against liquid flow with the lower end of said separation column, and said gel being adapted to be contacted on its lower end by a solution.

2. A device as in claim 1 wherein said gel is an electrolyte-entrapping polymer.

3. A device as in claim 2 wherein said polymer is a cross-linked polyacrylamide.

4. A device as in claim 1 wherein said gel is formed from an electrolytic buffer solution containing about 10–30% acrylamide monomer.

5. The device of claim 1 together with an outlet port in said tubular housing.

6. The device of claim 5 together with a passage from the upper gel surface to a position adjacent said port.

7. The device of claim 5 together with a separate inlet port in said tubular housing.

8. The device of claim 7 together with separate passages from the upper gel surface to positions adjacent said inlet and outlet ports.

9. An apparatus for separating a mixture of macromolecules by means of electrophoresis, chromatography, or electrochromatography, said device comprising upstanding column means containing a separating medium, vertical adapter means sealingly engaged to a mating lower end of said column means, said adapter means comprising a tubular housing means containing an electrically conductive, self-supporting gel means, said gel forming a seal against liquid flow from the column.

10. An apparatus for separating a mixture of macromolecules by means of electrophoresis, chromatography, or electrochromatography, said device comprising upstanding column means containing a separating medium, vertical adapter means sealingly engaged to a mating lower end of said column means, said adapter means comprising a tubular housing means containing an electrically conductive, self-supporting gel means, said gel means containing channel means interconnecting an opening in the wall of said housing with an opening at the top of said gel means wherein liquid flow from the column is directed through said channel means.

* * * * *